US006524211B2

(12) United States Patent
Okazaki

(10) Patent No.: US 6,524,211 B2
(45) Date of Patent: Feb. 25, 2003

(54) DIFFERENTIAL GEARS

(75) Inventor: Masaharu Okazaki, Okayama (JP)

(73) Assignee: OS Giken Co., Ltd., Okayama (JP)

( * ) Notice: Subject to any disclaimer, the term of this patent is extended or adjusted under 35 U.S.C. 154(b) by 0 days.

(21) Appl. No.: 09/824,800

(22) Filed: Apr. 4, 2001

(65) Prior Publication Data

US 2002/0006845 A1 Jan. 17, 2002

(30) Foreign Application Priority Data

Jul. 4, 2000 (JP) ........................................ 2000-106415

(51) Int. Cl.[7] .............................................. F16H 48/20
(52) U.S. Cl. ....................................... 475/241; 475/231
(58) Field of Search ................................ 475/231, 234, 475/235, 240, 241

(56) References Cited

U.S. PATENT DOCUMENTS

| 3,580,108 | A | * | 5/1971 | Mieras | 475/240 |
| 3,837,236 | A | * | 9/1974 | Kagata | 475/240 |
| 3,906,812 | A | * | 9/1975 | Kagata | 475/235 |
| 4,679,463 | A | * | 7/1987 | Ozaki et al. | 475/231 |
| 6,063,000 | A | * | 5/2000 | Sugimoto | 475/231 |

FOREIGN PATENT DOCUMENTS

| JP | 7-293665 A | * | 11/1995 |
| JP | 9-184563 A | * | 7/1997 |
| JP | 11-182650 A | * | 7/1999 |
| JP | 11-13854 A | * | 11/1999 |
| JP | 2000-27976 A | * | 1/2000 |
| JP | 2000-104807 A | * | 4/2000 |

* cited by examiner

*Primary Examiner*—Ankur Parekh
(74) *Attorney, Agent, or Firm*—Armstrong, Westerman & Hattori, LLP

(57) ABSTRACT

A differential gear that can switch from differential movement state to limited differential movement has: a pair of pressure rings 12 in a differential case 11 able to move in the direction of the axles but unable to rotate relatively; clutches 16 on opposite sides of the pressure rings 12 that limit differential movement between the left and right axles 1 by limiting the relative rotation of the differential case 11 and side gears 15; the pressure rings 12 are urged so as to decrease the clearance 17 between the pressure rings 12 but the clearance is increased by relative rotation torque between the pinion shaft 13 and differential case 11 in a differential state.

8 Claims, 11 Drawing Sheets

DIFFERENTIAL GEARS

BACKGROUND OF THE INVENTION

1. Field of the Invention

The present invention relates to a differential gear having a differential limiting function.

2. Description of the Related Art

Differential gears with a differential limiting function (limited slip differential) are used as differential gears in automobiles, which, when the wheels on only one side of the automobile are slipping, transmit sufficient torque to the wheels on the other side via clutch means. This type of differential gear is used widely for the purpose of preventing, when wheels on one side from slipping on ice, snow, or mud, the hindered transmission of torque to the wheels on the other side, and preventing the swerve phenomenon from occurring when the automobile is turning or starting abruptly.

For example, the differential gear 100 as shown in FIG. 11 is described in Japanese Patent Application Laid-Open No. S55-27980 and Japanese Patent Application Laid-Open No. 58-221046. This differential gear 100 comprises: a pair of pressure rings 103 accommodated in the differential case 101 such that they can move freely in the directions of axles 102 but cannot rotate relatively; a pinion shaft 104 that is placed at right angles to the axles 102 with the end thereof being held between the pressure rings 103; a pinion gear 105 provided rotatably on the pinion shaft 104; a pair of side gears 106, provided at the ends of the left and right axles 102 such that they cannot rotate relatively, and that sandwich the pinion gear 105 between them and engage with the pinion gear on the opposite sides thereof; operation means 108 for operating the pressure rings 103 in such a direction as to increase the clearance 107 between the pressure rings 103 in accordance with an increase in relative torque between the pinion shaft 104 and differential case 101 in a differential state; and clutch means 109 that are provided on the opposite sides, in the directions of the axles, of the pressure rings 103 and that are operated by the pressure rings 103 to limit the differential between the left and right axles 102 as the clearance 107 becomes greater.

Various forms of the operating means 108 have been proposed. One of the means adopted is a means, for example, in which a square cam part 110, one diagonal line of which is set in the directions of axles, is formed at the end of the pinion shaft, and in which a substantially V-shaped cam groove 111 is formed in the pressure rings 103 to engage with the cam part 110.

Also, in this differential gear 100, a relative torque arises between the pinion shaft 104 and differential case 101 and widening of the clearance 107 between the pressure rings 103 using the operating means 108 causes the clutch means 109 to operate and the differential between the left and right wheels to be limited. However, normally an elastic member 112, such as a disc spring, is provided outside the clutch means 109 along the axis so that the clearance 107 between the pressure rings 103 returns to its set gap. The differential gear is also configured so that it exerts pressure that draws the pressure rings 103 close to each other via the multiplicity of clutch plates 113 in the clutch means 109.

SUMMARY OF THE INVENTION

Basically, it is preferable that this type of differential gear 100 enters the differential state to enable a small turning circle when low speed circling is required such as when parking a car in a garage or at the side of the street, and enters the limited differential state to enable the desired functions to work with stability when the wheels on one side of the car are slipping, when the car is moving forward quickly, or when it is turning at high speed or under heavy loads.

However, in the elastic member 112 in the above differential gear 100, because the pressure rings 103 are urged to come closer to each other through clutch plates 113, when the urging force is weak, the clutch means 109 becomes easy to operate using the operation means 108 and the limited differential state occurs even when the automobile is turned at low speeds. This means that the differential state is not always stable. When the urging force is made stronger, the operation means 108 enables the differential state. However, because the clutch plates 113 are always frictionally abutted by the urging force exerted by the elastic member 112 and substantially is in a limited differential state, a stable differential state cannot be guaranteed when a automobile is made to turn a circle at low speeds. That is, there will be various problems such as that the automobile cannot make a sharp small turn when rotating at low speeds, or the so-called "chattering" phenomenon arises, in which there is alternate switching between the limited slip differential and differential state and, as a result, maneuverability deteriorates and the shocks that occur with chattering adversely affect the differential gear 100 and peripheral equipment.

Therefore, it is extremely difficult to specify the urging power that should be applied. For example, in racing automobiles used for sport, maneuverability during low speed rotation is sacrificed to some degree and the urging power exerted by the elastic member 112 is set higher so that a sufficient limited differential can be obtained at high speeds and under high loads.

Also, in automobiles with transverse engines, the layout demands of the engine and peripheral components mean that the shape and capacity of the differential case are greatly restricted compared to automobiles with vertical engines. For example, as in the differential gear 120 shown in FIG. 12, the right part of the differential case 121 has had to be narrowed. It is difficult to adequately increase the area of the frictionally abutting section of the clutch means 122 and if the pressure exerted on the elastic member 123 is increased to increase the friction abutting force, a differential state is not obtained when low speed rotation is required. This means that an adequate limited differential action cannot be obtained.

The present invention provides a differential gear that can switch, as appropriate, between differential and limited differential states.

The differential gear according to one embodiment of the invention comprises: a differential case that is rotated by a driving force from the engine, around the left and right axles; a pair of pressure rings accommodated in said differential case so as to be able to move freely in the direction of the axles but unable to rotate relatively; a pinion shaft provided at right angles to the axles with an end thereof held between said pressure rings; at least one pair of pinion gears provided rotatably on said pinion shaft; a pair of side gears, each being placed at the end of said left and right axles so as to be unable to rotate relatively, that sandwich the pinion gears and engage with the pinion gears on the opposite sides thereof; a set of clutch means arranged on the opposite sides, in the direction of the axles, of said pressure rings and that can limit the differential movement between the left and right axles by limiting the relative rotation of the differential case and side gears; urging means that urges the pressure rings in such directions as to decrease the clearance between the pressure rings without use of said clutch means; and operation means that operates the pressure rings against the urging force exerted by the urging means in such directions as to increase the clearance between the pressure rings in accordance with an increase in the relative rotation torque between the pinion shaft and differential case in a differential state.

In this differential gear, when the rotation resistance is the same for both the left and right wheels, the pinion gear, side gears, pinion shaft, and pressure rings all rotate integrally with the differential case and the left and right wheels rotate at the same speed. However, when the rotation resistance is different for the left and right wheels, the pinion revolves while engaging with the side gear using part of the torque that acts on the differential case, and the differential gear switches to either a differential state in which the rotation speed of the wheel on the side of less resistance is faster than the rotation speed of the wheel of more resistance, or a limited differential state in which the relative rotation between the side gears and the differential case is limited and part of the rotation torque that works on the differential case is distributed to the wheels on the side with greatest resistance.

More specifically, when the rotation resistance of the left and right wheels is different, the operating force that acts in a direction to increase the clearance between the pressure rings in accordance with the relative torque between the pinion shaft and the differential case, acts on the pressure rings. However, when the operating force of this operating means is smaller than the urging force brought about by the urging means that attempts to reduce this clearance, the clearance does not change and an ordinary differential state is obtained. However, when it is greater than the urging force, the clearance between the pressure rings increases accordingly, the clutch plates in the clutch means are frictionally abutted, and the differential between the left and right axles is limited.

Now, the urging means for this differential gear exerts a force on the pressure rings in a direction that narrows the clearance without going through the clutch means. Even when a strong urging force is set for this urging means, the clutch plates of the clutch means will not abut directly, and the timing of the switching from the differential to limited differential state depends only on the operating power provided by the operating means and the urging force provided by the urging means. Therefore, by setting the urging force of the urging means at an appropriate level, an accurate differential state can be obtained for low speed turning and an accurate limited differential state can be obtained for high speed, heavy load turning.

The differential gear according to a second embodiment of the invention comprises: a differential case that is rotated by a driving force from the engine around the left and right axles; pressure rings accommodated in said differential case so as to be able to move freely in the direction of the axles but unable to rotate relatively; a pinion shaft provided at right angles to the axles with an end thereof being held between said pressure ring and the face, opposing to the pressure ring, of the differential case facing to the pressure ring; at least one pair of pinion gears provided rotatably on said pinion shaft; a pair of side gears, each being placed at the end of said left and right axles so as to be unable to rotate relatively, that sandwich the pinion gears and engage with the pinion gears on the opposite sides thereof; clutch means arranged on the opposite sides to the opposing faces of said pressure ring and that can limit the differential movement between the left and right axles by limiting the relative rotation of the differential case and side gears; urging means that urges the pressure rings in such directions as to decrease the clearance between the pressure ring and the face opposing to the pressure ring of the differential case, without use of said clutch means; and operation means that operates the pressure rings against the urging force exerted by the urging means in such directions as to increase the clearance between the pressure ring and the face opposing to the pressure ring of the differential case in accordance with an increase in the relative rotation torque between the pinion shaft and differential case in a differential state.

In this differential gear, basically, when the rotation resistance of the left and right wheels is the same, the pinion gear, side gears, pinion shaft, and pressure rings rotate integrally with the differential case and the left and right wheels rotate at the same speed. However, when the rotation resistance of the wheels is different, the pinion revolves while it engages with the side gears using part of the torque that acts on the differential case. There is then a switch to either a differential state in which the rotation speed of the wheels with least rotation resistance is greater than the rotation speed of the wheels with greatest rotation resistance or a limited slip differential state in which the relative rotation of the side gears and differential case is limited using the clutch means and part of the torque that acts on the differential case is distributed to the wheels with greatest rotation resistance.

More specifically, if the rotation resistance of the left and right wheels is different, when the operating force of the operation means, which acts to increase the clearance between the pressure ring and the face opposing to the pressure ring of the differential case according to the relative torque between the pinion shaft and differential case, is smaller than the urging force of the urging means, which acts to reduce this clearance, the clearance will not change and a normal differential state will be obtained. When the operating force is greater than the activation force, the clearance between the pressure ring and the ring opposing face will increase accordingly, the clutch plates in the clutch means will be frictionally abutted, and the differential between the left and right wheels will be limited.

In the urging means in this differential gear, the pressure ring is urged in such a manner that the clearance is reduced without using the clutch means. Even when a high urging force is set for the urging means, the clutch plates in the clutch means will not be frictionally abutted, and the timing of the switching from the differential to limited differential state depends only on the operation force in the operation means and the urging force in the urging means. Therefore, by setting the urging force to an appropriate level, an accurate differential state can be obtained when turning at low speeds and an accurate limited differential state can be obtained when turning at high speeds and under heavy loads.

Furthermore, only one clutch means need be installed in this differential gear. This improves the ease of assembling the differential gear and enables the incorporation of a clutch means in a side where space is available. This means that a small differential gear can be built while the size of clutch plate can be maximized to increase the friction abutting force. Therefore, this type of differential gear can be used in engines where there are major restrictions on the form and size of the differential case and in automobiles with transverse engines. When only one clutch means is installed, the relative rotation between one side gear and the differential case is directly limited by the clutch means and the relative rotation between the other side gear and the differential case is limited by the clutch means via the pinion and the first side gear.

The urging means may be provided in the vicinity of the ends of the pinion shafts within the pressure rings. The urging means can be disposed in any position but the operating force that acts to increase the clearance normally acts on the pressure rings from the ends of each pinion shaft. Therefore, by placing the urging means near the ends of the pinion shafts, the operating force can act in a balanced way with the urging force. This is preferable since it improves the ease with which pressure rings can slide.

Alternatively, the urging means may be provided between the ends of the pinion shafts adjoining the pinion shafts within the pressure rings. The ends of the pinion shafts are held between the pressure rings or between the pressure ring and the ring opposing face and therefore, if the urging means is located further outside in the radial direction than the end of the pinion shaft, the size of the pressure rings and differential case will be increased by that amount. Therefore, it is preferred that the urging means be provided between the adjoining ends of the pinion shaft within the pressure rings in terms of reducing the sizes of the pressure rings and differential cases. This configuration also allows the ends of the pinion shafts to extend inside the differential case and increases the area of the contact between the pinion shaft and the pressure rings. This effectively prevents friction between and damage of these two members caused by the relative torque acting between the pinion shaft and the pressure rings and improves the durability of the differential gear.

DESCRIPTION OF THE PREFERRED EMBODIMENTS

Aspects of the embodiment of the present invention will be explained with reference to the diagrams.

Figure 1:
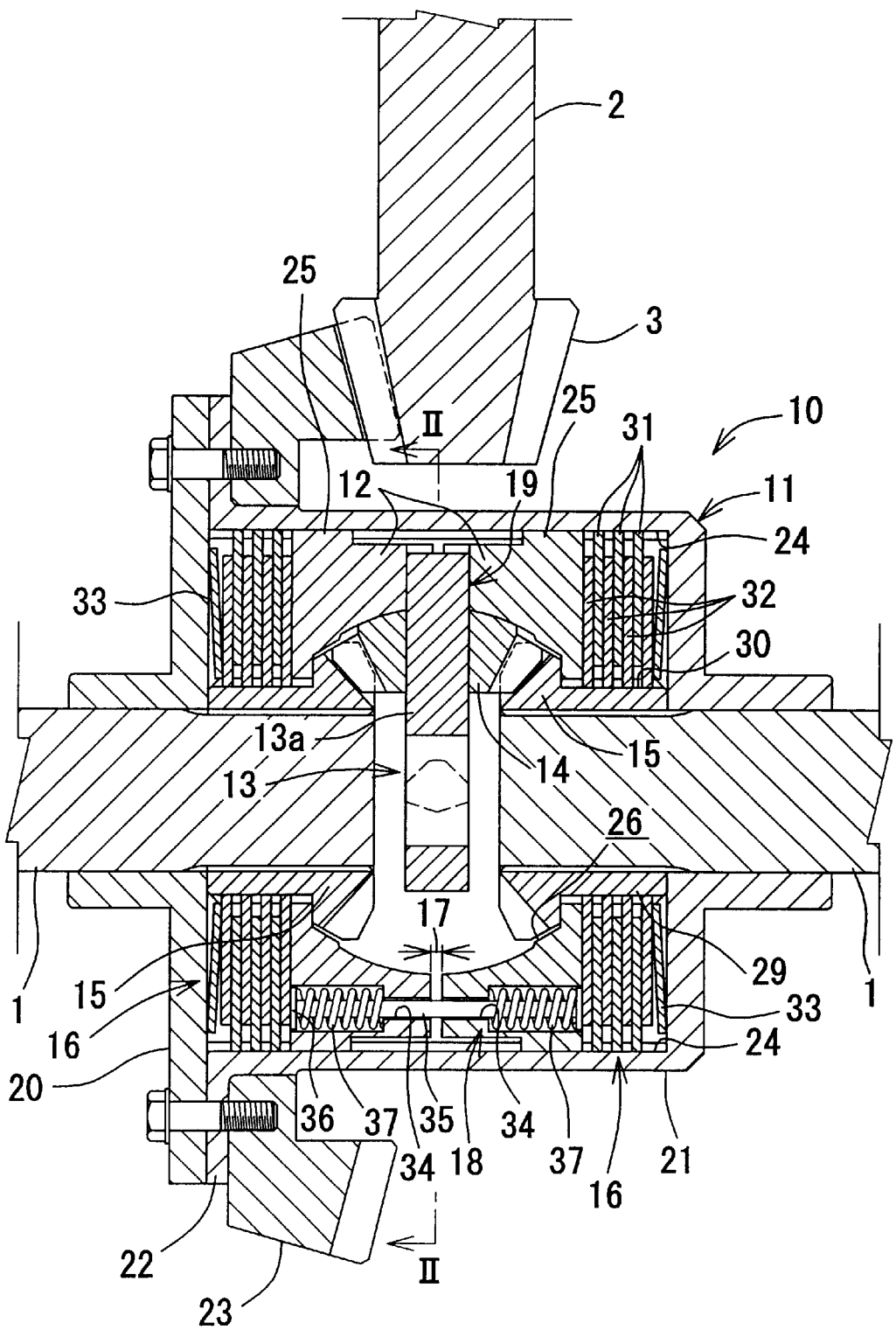
FIG. 1 is a transverse cross-section of the differential gear along I—I in FIG. 2.
Figure 2:
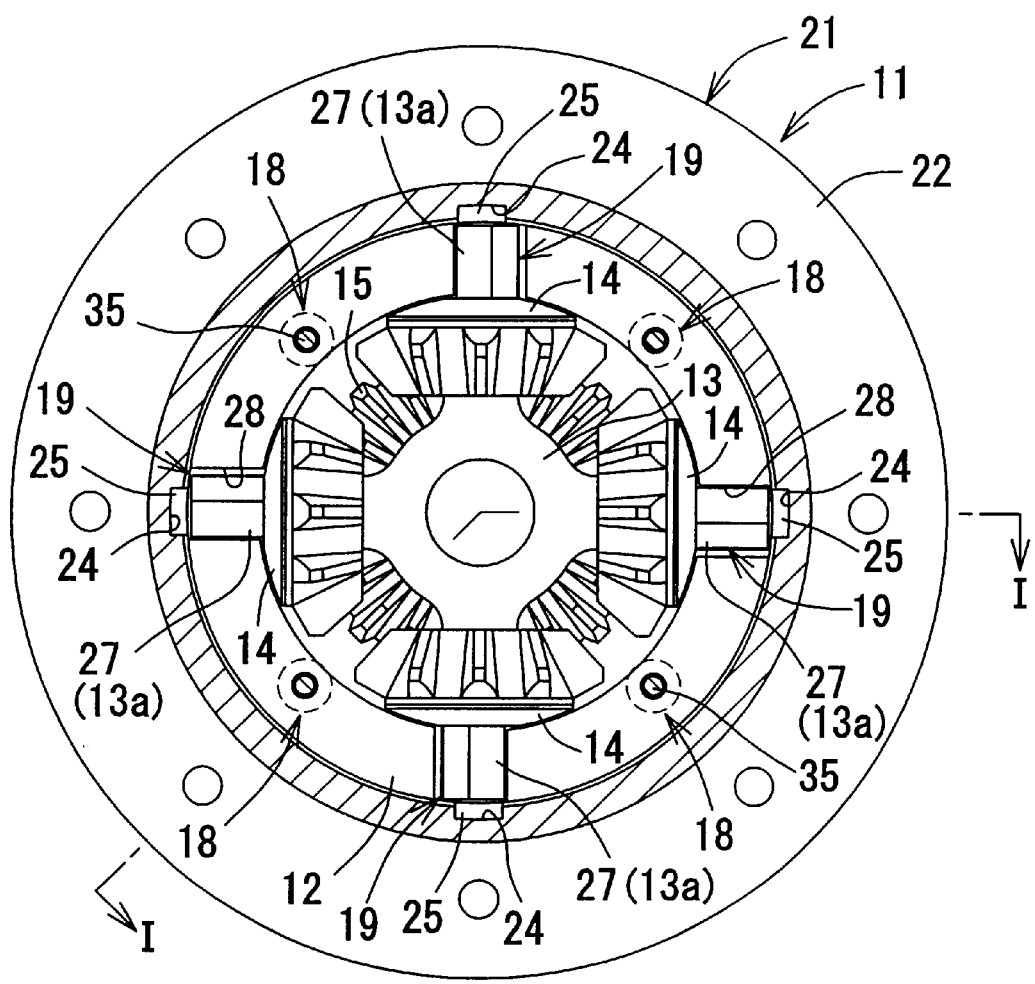
FIG. 2 is a cross-section along II—II in FIG. 1.
Figure 3:
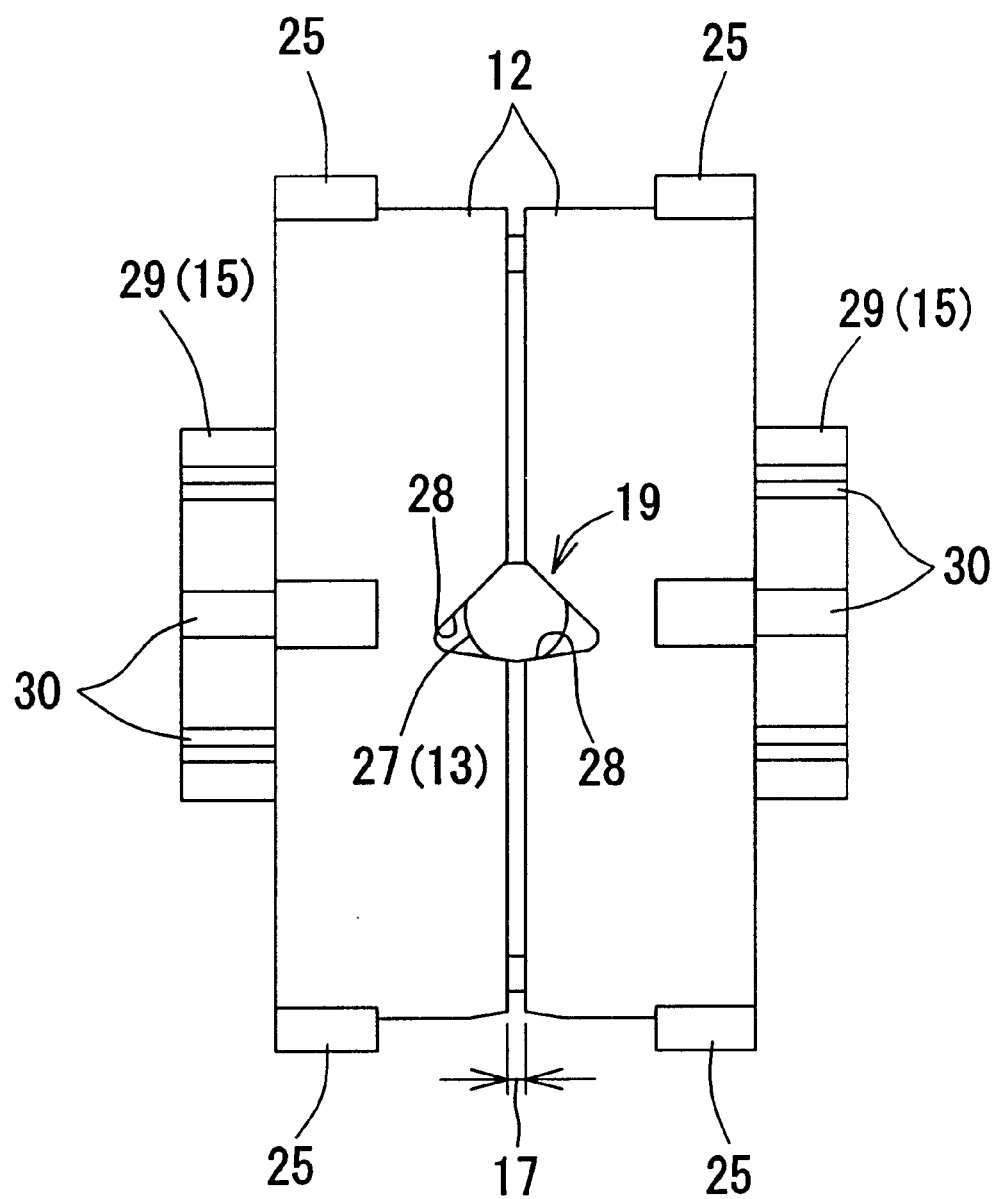
FIG. 3 is a side view of a pressure ring.

As shown in FIGS. 1 through 3, this differential gear 10 comprises: a differential case 11 that is rotated by a driving force from an engine (not shown in the drawings) around the left and right axles 1; a pair of pressure rings 12 that can move freely in the directions of the axles within the differential case 11 but that cannot rotate relatively; a pinion shaft 13 provided at right angles to the axles 1 with the end thereof held between the pressure rings 12; at least one pair of pinion gears 14 provided rotatably on the pinion shaft 13; a pair of side gears 15, each of which is placed on the end of either the right or left axle so that it cannot rotate relatively, that sandwiches the pinion gears 14 and engages with the pinion gears 14 on the opposite sides thereof; a set of clutch means 16, located on the opposite sides of the pressure rings in the directions of axles, that can limit the differential between the left and right axles 1 by limiting the relative rotation between the differential case 11 and side gears 15; an urging means 18 that urges the pressure rings 12 in the direction to reduce the clearance 17 between the pressure rings 12 without using the clutch means 16; and an operating means 19 that operates the pressure rings 12 against the urging force of the urging means 18 to increase the clearance 17 between the pressure rings and that activates the clutch means 16.

The differential case 11 is divided into a cover member 20 and a case body 21. The cover 20 is fixed onto a flange 22 formed at the left end of the case body 21. On the opposite side to the cover member 20, a ring gear 23 is fixed onto the flange part 22 and this ring gear 23 is engaged by the drive pinion 3 provided on the drive shaft 2 that extends from the engine. Also, in the differential case 11, the ends of the right and left axles 1 coaxially pass through the cover member 20 and the right-side wall of the case body 21. The differential case 11 is configured such that it is driven and rotated around the axles 1 by the driving force from the engine via the drive pinion 3 and ring gears 23.

On the inside circumference of the case body 21, a plurality of linear grooves 24 extending over the whole length of the case body 21 in the direction of axles, are formed at set intervals around the circumference. Inside the case body 21, the pair of pressure rings 12, with concave profiles, are provided such that their concave parts face one another. Projections 25 that engage with the grooves 24 are provided around the outside face of the pressure rings 12. The engagement of the projections 25 and grooves 24 help to locate the pressure rings 12 in the case body 21 so that they can move freely in the direction of axles but cannot rotate relative to the case body 21. The size and form of the differential case 11 can be set to suit the automobile in which it is being installed. Furthermore, as long as the groove 24 and projection 25 are of a configuration that allow pressure rings 12 to move freely in the direction of axles but unable to rotate relatively, they can be made with any profile and there can be any number of them.

A substantially cross-shaped pinion shaft 13 is provided in the gear chamber 26 that is formed between the pressure rings 12. Four axes 13a that extend out at right angles to the axles 1 are formed in this pinion shaft 13 and pinion gears 14 are supported so that they rotate freely on each of these axes 13a. Although any number of pinion gears 14 can be installed, at least one pair shall be provided.

Figure 4:
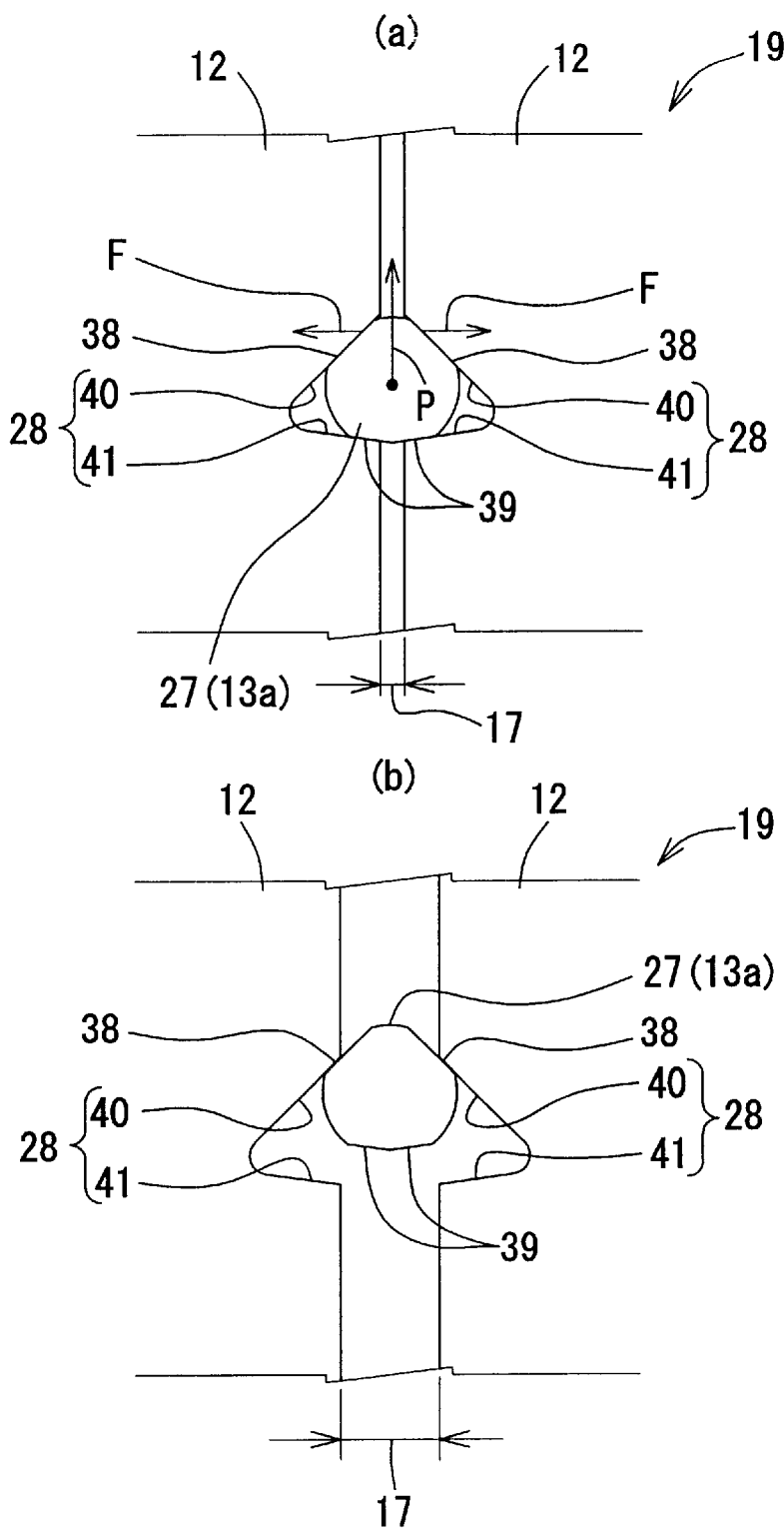
FIG. 4 consists of diagrams illustrating how the operating means operates.

Cams 27 are formed on the ends of each of the axles in the pinion shaft 13 as shown in FIGS. 2 through 4. Cam grooves 28 corresponding to each of these cams 27 are formed on the parts on the mutually facing side of the peripheral walls of the pressure rings 12. The pinion shaft 13 is supported in the gear chamber 26 because the cam 27 of each axis 13a is held between the cam grooves 28 on the pressure rings 12. The operating means 19 is configured from these cams 27 and cam grooves 28 but this will be explained later.

Inside the gear chamber 26, a pair of side gears 15 that engage with the pinion gears 14 are provided on either side of the pinion gear 14. The left and right axles 1 penetrate the pressure rings 12, protruding into the gear chamber 26. A spline engagement is used to link the left and right side gears 15 to the ends of the left and right axles so that they cannot rotate relative to the axles. On the side gears 15, sleeves 29 that go along the axles 1, penetrate the pressure rings 12 and extend to the outside are formed as single units. A plurality of grooves 30 are formed at set intervals around the circumference on the outside of these sleeves 29.

Clutch means 16 are provided on the outside of the each sleeve 29 of the side gears 15 on the opposite sides of the pressure rings 12 in the direction of axles. First clutch plates 31 and second clutch plates 32 are arranged alternately within the left and right clutch means 16. Therefore, first clutch plates 31 are fitted inside the differential case 11 using the grooves 24 on the differential case 11 so that they can move freely in the direction of axles but cannot rotate relative to the differential case 11. The second clutch plates 32 are fitted over the sleeve 29 so that they can move freely in the grooves 30 on the sleeve 29 in the direction of axles but cannot rotate relatively to the sleeve 29. The configuration means that when the clutch plates 31 and 32 are pressed against each other, the relative rotation between the differential case 11 and side gears 15 is limited in accordance with the frictional force produced between the neighboring clutch plates 31 and 32. Any number of clutch plates 31 and 32 can be used. However, if there are too few, the limited slip differential function will not be exhibited properly and if there are too many, a large differential gear 10 will be required. Therefore, it is preferable to provide between four and eight clutch plates for each clutch means 16.

On the outside of the clutch means 16 there are disc springs 33 that urge the clutch plates 31 and 32 towards the pressure rings 12. These disc springs 33 are provided to eliminate play between the clutch plates 31 and 32. The urging force exerted by these springs is set to a level at which there is almost no frictional force acting between the clutch plates 31 and 32. Note here that disc springs need not be used when the clutch means 16 is installed so that there is substantially no play.

An urging means 18 is provided between the pressure rings 12 for urging the pressure springs 12 towards each other. Specifically, through holes 34 are provided in the pressure rings 12 between the ends of the axes 13a that adjoin the pinion shaft 13. A rod member 35 that extends across the pressure rings is inserted in these holes 34. Even when the pressure rings 12 are at their closest to each other, that is when the clearance 17 between the pressure rings 12 is minimized, the length of the rod member 35 is set so that it does not protrude outside the pressure rings 12. Guards 36 are fitted to the ends of the rod member 35. Elastic members 37, created from compression coil springs, sheath the left and right parts of the rod member 35. The pressure rings 12 are always urged to move towards each other by these elastic members 37 via the rod member 35.

So far as the urging means 18 is configured so that the urging force always acts to bring the pressure rings 12 closer to one another without using the clutch means 16, any number of urging means can be provided in any position as explained below. However, as described above, if the urging means 18 is provided between the ends of axles adjoining the pinion shaft 13 within the pressure rings 12, they can be arranged in the dead space between the axles 13a (=27). Then, as well as configuring pressure rings 12 and the differential case to have a small diameter, the ends of the pinion shaft 13 can extend to inside the differential case 11 and the contact area between the cams 27 and cam grooves 28 in the operating means 19, explained below, can be increased. This means then that the relative torque that acts between the cams 27 and cam grooves 28 can effectively prevent damage or wear to the parts and the durability of the differential gear can be improved.

As shown in FIGS. 3 and 4, the operating means 19 comprises the cams 27 provided at the ends of the four axes 13a in the pinion shaft 13, and the cam grooves 28 formed on the mutually facing parts of the pressure rings 12. The cams 27 comprise: a pair of operating surfaces 38 formed substantially in an inverted V shape, in mirror symmetry with respect to the orthotomic surface of the axles that include the center of the axes 13a, and abutting surfaces 39 that are formed on the opposite side to the operating surfaces 38 with the centers of the axes 13a interposed therebetween and extend substantially in the direction of axles. The cam groove 28 is formed substantially in the shape of a right-angled triangle with a sloping cam surface 40 formed to suit the operating surfaces 38 and a latch surface 41 to suit the abutting surface 39.

When the pinion shaft 13 rotates from the state in FIG. 4a relatively and slightly upwards from the pressure rings 12, as shown in FIG. 4b, the pressure rings 12 move away from each other via the operating surfaces 38 and sloping cam surface 40. When the pinion shaft attempts to rotate relatively and slightly downwards in FIG. 4a, the abutting surface 39 latches onto the latch surface 41, restricting the relative rotation between the pressure rings 12 and the pinion shaft 13. Note that as long as the relative torque between the pinion shaft 13 and differential case 11 is able to operate the pressure rings 12 so that they move away from one another, the operating means 19 can take on any configuration. For example, as described in relation to the conventional arts, a substantially square or diamond shaped cam 27 is formed in which one diagonal line is placed substantially in the direction of axles, and a substantially v-shaped cam groove 28 is formed so as to fit the cam.

Next, the actions of the differential gear 10 will be explained.

In this differential gear 10, when the rotation resistance is the same between the left and right wheels, the pinion gears 14, side gears 15, pinion shaft 13, pressure rings 12, and differential case 11 all rotate as one unit and the left and right wheels rotate at the same speed.

Also, when the rotation resistance of the wheels on one side decreases when the automobile is moving forwards, basically, the pinion gears 14 use part of the torque acting on the differential case 11 to revolve while engaging with the side gears 15. This produces a differential state, in which the rotation speed of the wheels on the side with least rotation resistance is higher than that of the wheels on the side with most rotation resistance. However, the relative rotation between the side gears 15 and differential case 11 at high speeds and under heavy loads is limited by the friction abutting between the clutch plates 31 and 32 in the clutch means 16 and this produces a limited differential state. Thus, the turning performance at low speeds is improved and the maneuverability at high speeds and under heavy loads is maintained.

More specifically, if a difference in rotation resistance arises between the left and right wheels when a automobile is moving forwards, as shown in FIG. 4a, the operating means 19 produces a relative torque P between the pinion shaft 13 and the differential case 11. Due to this relative torque P, the operating force F, which acts on the pressure rings 12 so that they move away from one another via the operating surfaces 38 of the cam 27 and the sloping cam surface 40 of the cam groove 28, works on the pressure rings 12. As shown in FIG. 4b, the clearance 17 increases because the contact position between the operating surfaces 38 of the cam 27 and the sloping cam surface 40 of the cam groove 28 is dislocated so that the pinion shaft 13 and differential case 11 slightly rotate relative to each other.

On the other hand, the urging force of the urging means 18 is always working on the pressure rings 12 to make them move towards each other. Therefore, when the operating force F of the operation means 19 is smaller than the urging force of the urging means 18, as shown in FIG. 4a a minimum clearance 17 is maintained and a differential state is produced. When the operating force F is greater than the urging force, as shown in FIG. 4b, the clearance 17 increases in accordance with the difference between the forces. The clutch plates 31 and 32 on the sides of the pressure rings 12 are compressed, and a limited differential state is produced by friction abutting of the clutch plates 31 and 32.

Also, in this differential gear 10, the pressure rings 12 are urged to come closer to each other by the urging means 18 without the use of the clutch means 16. Therefore, the timing of the switch from differential to limited differential state depends only on the operating force F of the operating means 19 and the urging force of the urging means 18. By setting the urging force in the urging means 18 to an appropriate level, an accurate differential state is obtained for slow turning and an accurate limited differential state is obtained for turning at high speeds or under heavy loads.

On the other hand, if the rotation resistance of the wheels is less on one side when a automobile is moving backwards, even when relative torque is produced between the pinion shaft 13 and differential case 11, the abutting surface 39 of the cam 27 latches onto the latch surface 41 of the cam groove 28 and this relative torque regulates the relatively slight rotation of both. Therefore, a state in which the minimum clearance 17 is maintained is produced and a limited differential state will not be produced. Note here that even when a automobile is moving backwards, as when a automobile is moving forward, the configuration can allow switching between the differential and limited differential states. In this case, the cam part is formed in a square or diamond shape as described above as the operating means 19 and the cam groove used is formed in a substantially V shape to suit the cam.

Next, another aspect of the embodiment in which the configuration of the urging means 18 is partially changed will be explained. Note that the same symbols are used for the same members as in the above example, so detailed explanation of these will be omitted.

Figure 5:
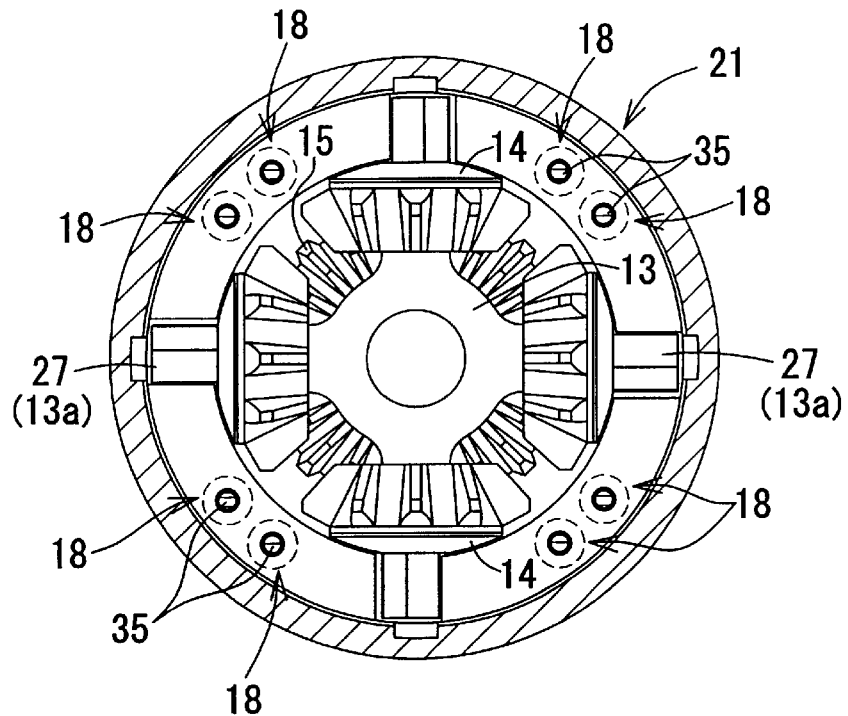
FIG. 5 is an illustration showing another layout for the urging means.
Figure 6:
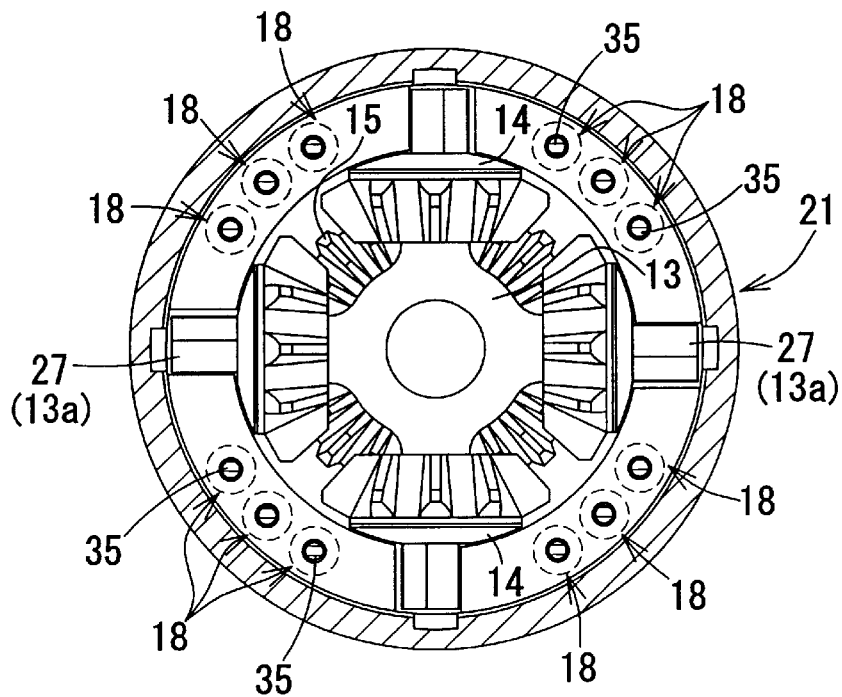
FIG. 6 is an illustration showing another layout for the urging means.

(1) Any number of urging means 18 can be used. For example, as shown in FIG. 5, two each can be installed between the opposite ends of the pinion shaft 13 within the pressure rings 12 or, as shown in FIG. 6, three each can be installed between the ends of the pinion shaft 13 within the pressure rings 12. Note that the pressure rings 12 are operated in the direction of axles by the operation means 19 and so urging means 18 can be installed close to the ends of the pinion shaft 13 so that it acts in a balanced way against the pressure rings 12.

Figure 7:
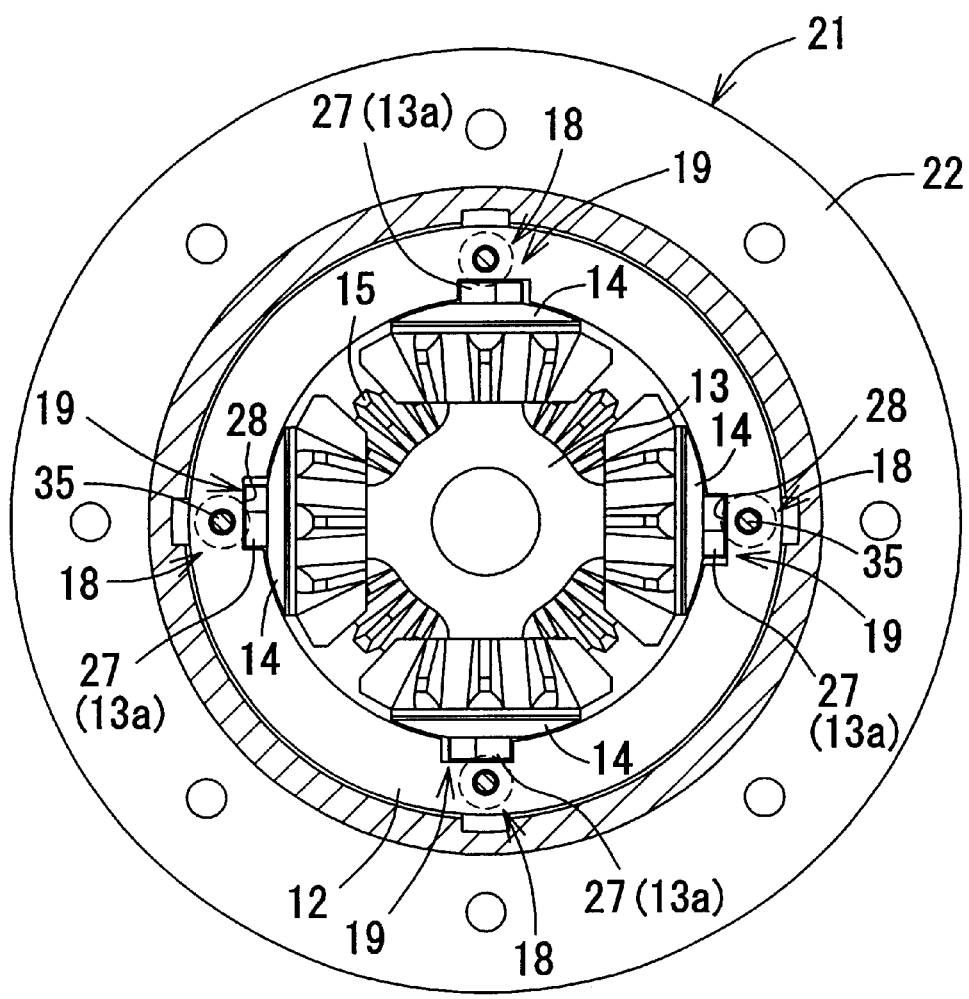
FIG. 7 is an illustration showing still other layout for the urging means.

(2) As shown in FIG. 7, the urging means 18 can also be arranged so that the rod members 35 are to be installed on the outside of the ends of the pinion shaft 13 within the pressure rings 12. Here, the operating force from the operating means 19 can act on the pressure rings 12 in a balanced way.

Figure 8:
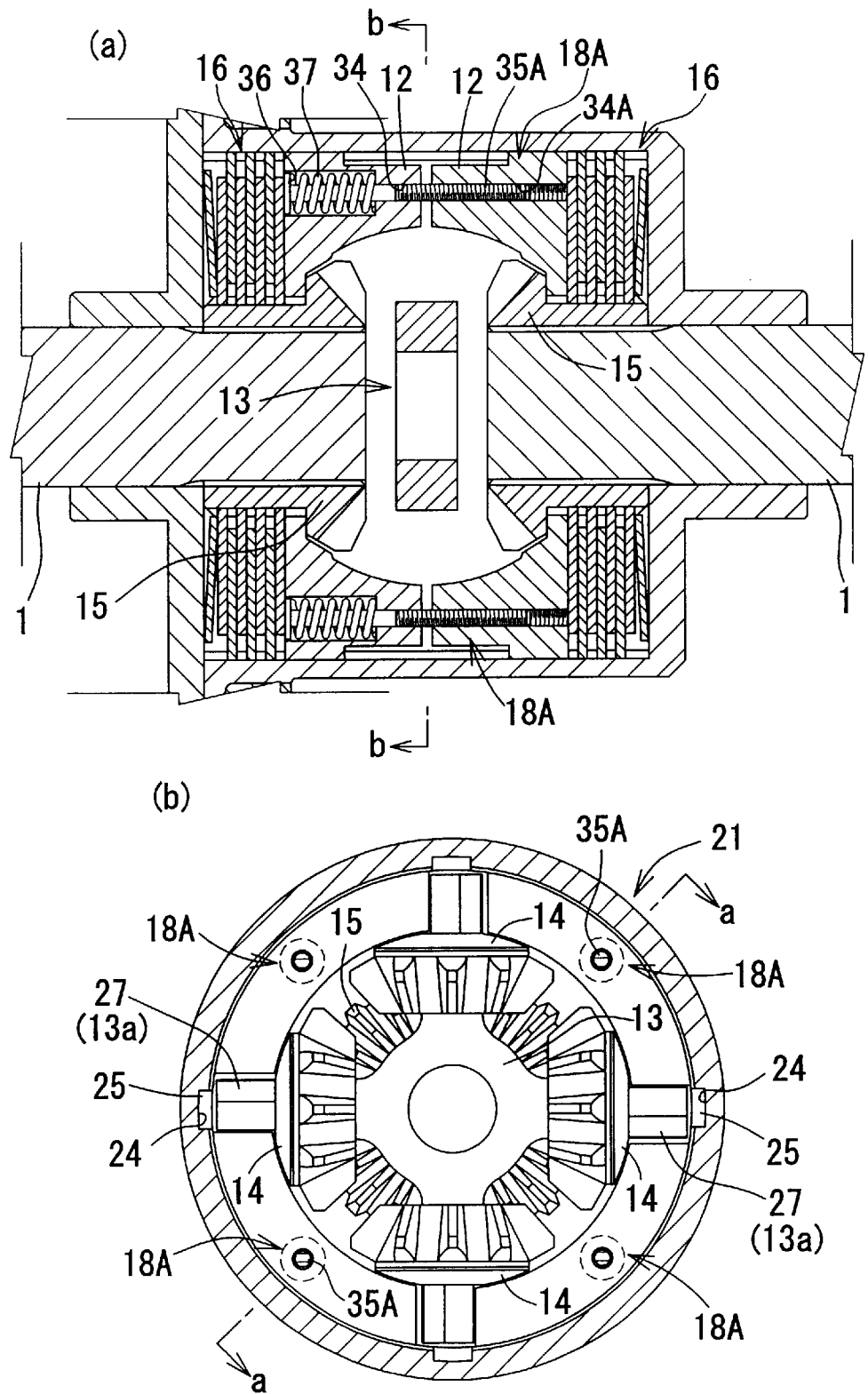
FIG. 8a is a cross-section along a—a in FIG. 8b showing a differential gear in which an urging means of an alternative configuration has been incorporated.
FIG. 8b is a cross-section along b—b for the same differential gear.

(3) As shown in FIG. 8, the following urging means 18A can be adopted. That is, a rod member 35A, in which one end has a spiral section, is used in place of the rod 35, a screw hole 34A is formed on one pressure ring 12, an elastic member 37 sheathes the rod member 35A, and the rod 35A is installed in the hole 34 in the other pressure ring 12, its spiral section linking up with the screw hole 34A. This type of urging means is preferable because it can be easily assembled.

Figure 9:
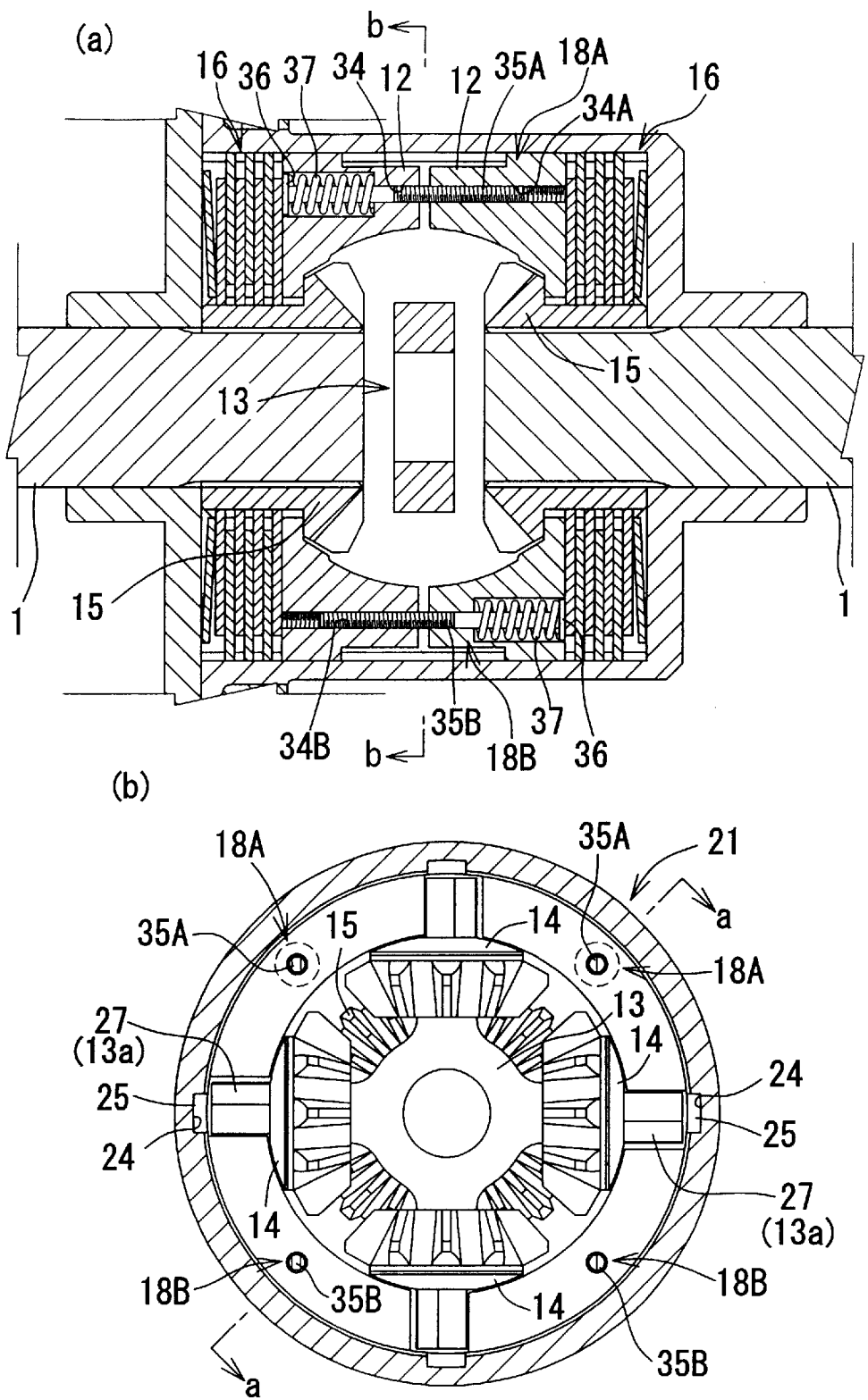
FIG. 9a is a cross-section along a—a in FIG. 9b showing a differential gear in which an urging means of an alternative configuration has been incorporated.
FIG. 9b is a cross-section along b—b for the same differential gear.

Also, as shown in FIG. 9, it is possible to use both urging means 18A and 18B so that neighboring urging means are the same type of means or different types are arranged alternately. The urging means 18B is installed in the opposite left-right direction to urging means 18A. That is, in a state in which rod member 35B formed with a spiral at one end is used, a screw hole 34B is formed in the other pressure ring 12, and an elastic member 37 sheathes the rod member 35B, the rod member 35B is inserted into the penetrating hole 34 of the first pressure ring 12 and the spiral part links up to the screw hole 34B.

The configurations (1) through (3) above can be combined as desired. It is also possible to use any configuration for the urging means 18, without going through the clutch means 16, as long as it exerts a force that pushes the pressure rings 12 towards each other. For example, disc springs or synthetic rubber can be used instead of compression coil springs or the pressure ring 12 can be pulled towards each other using tension springs, or any other ways. Furthermore, an urging means can be installed between the differential case 11 and pressure rings 12.

Next, an instance in which the present invention is applied in a differential gear 10C in a transverse engine will be explained. Now, the same codes are used for the same materials as in the above aspects of the embodiment and therefore, detailed explanation of these shall be omitted.

Figure 10:
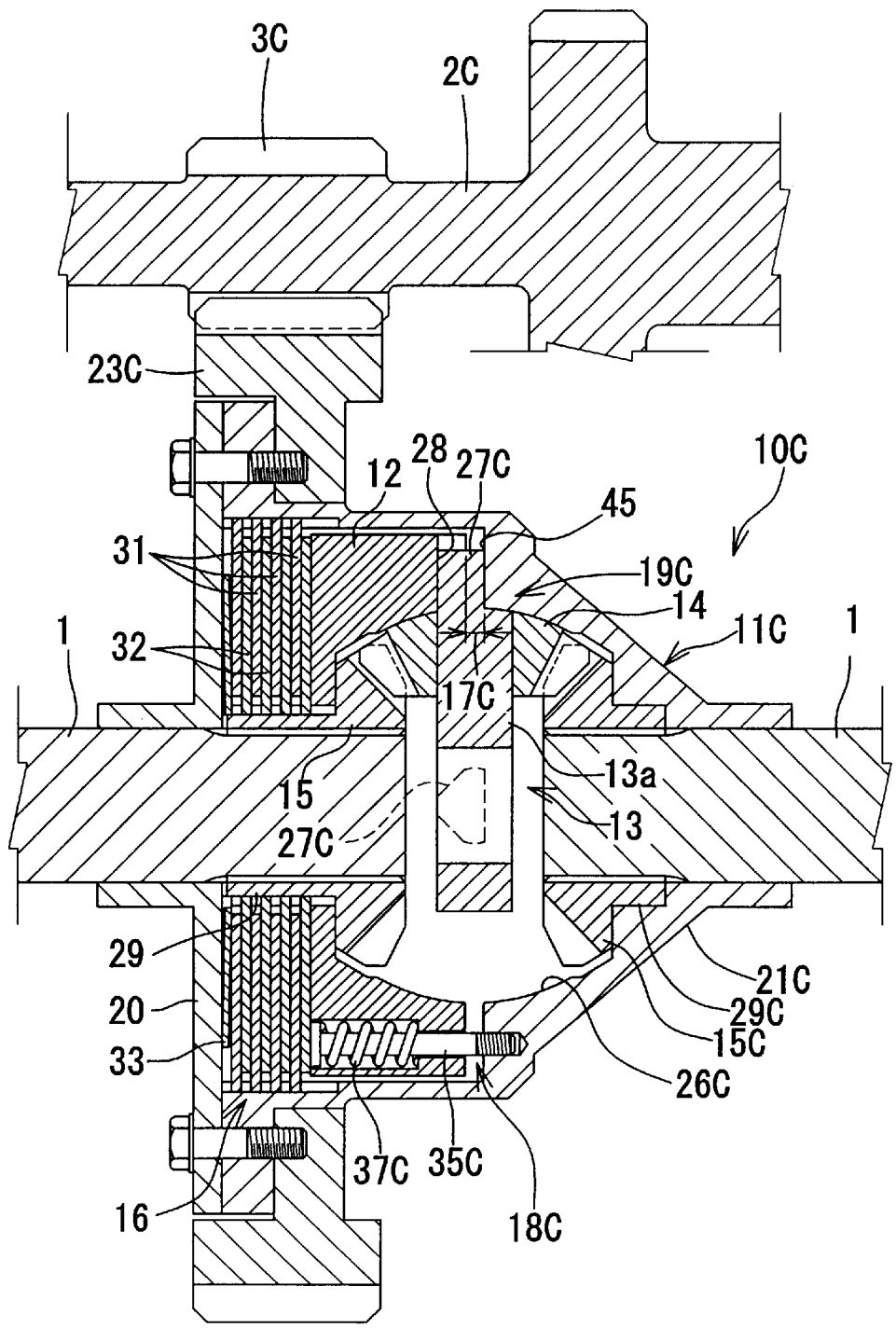
FIG. 10 is a diagram corresponding to FIG.1, showing a differential gear of another configuration.
Figure 11:
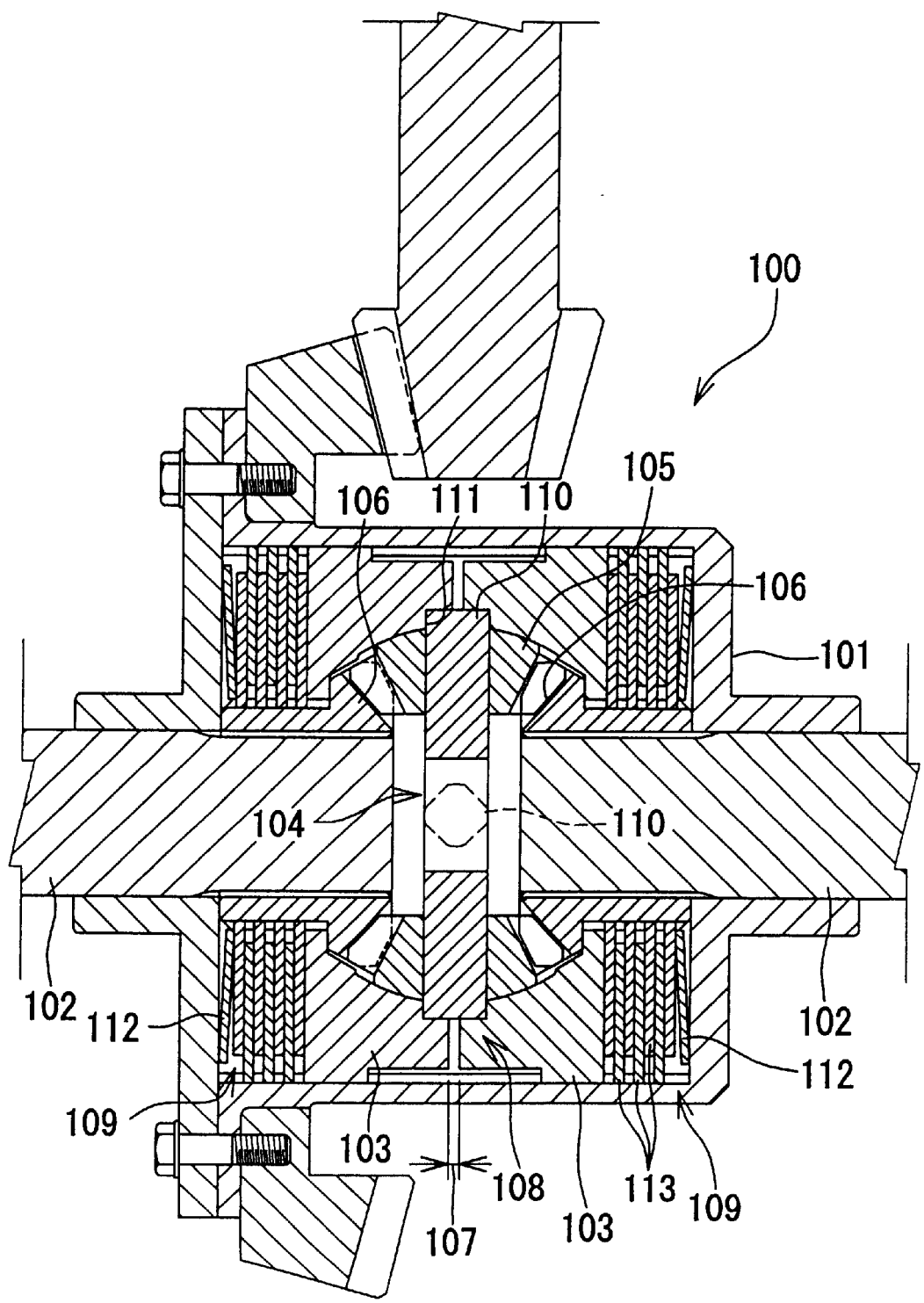
FIG. 11 is a transverse cross-section of a differential gear according to prior art.
Figure 12:
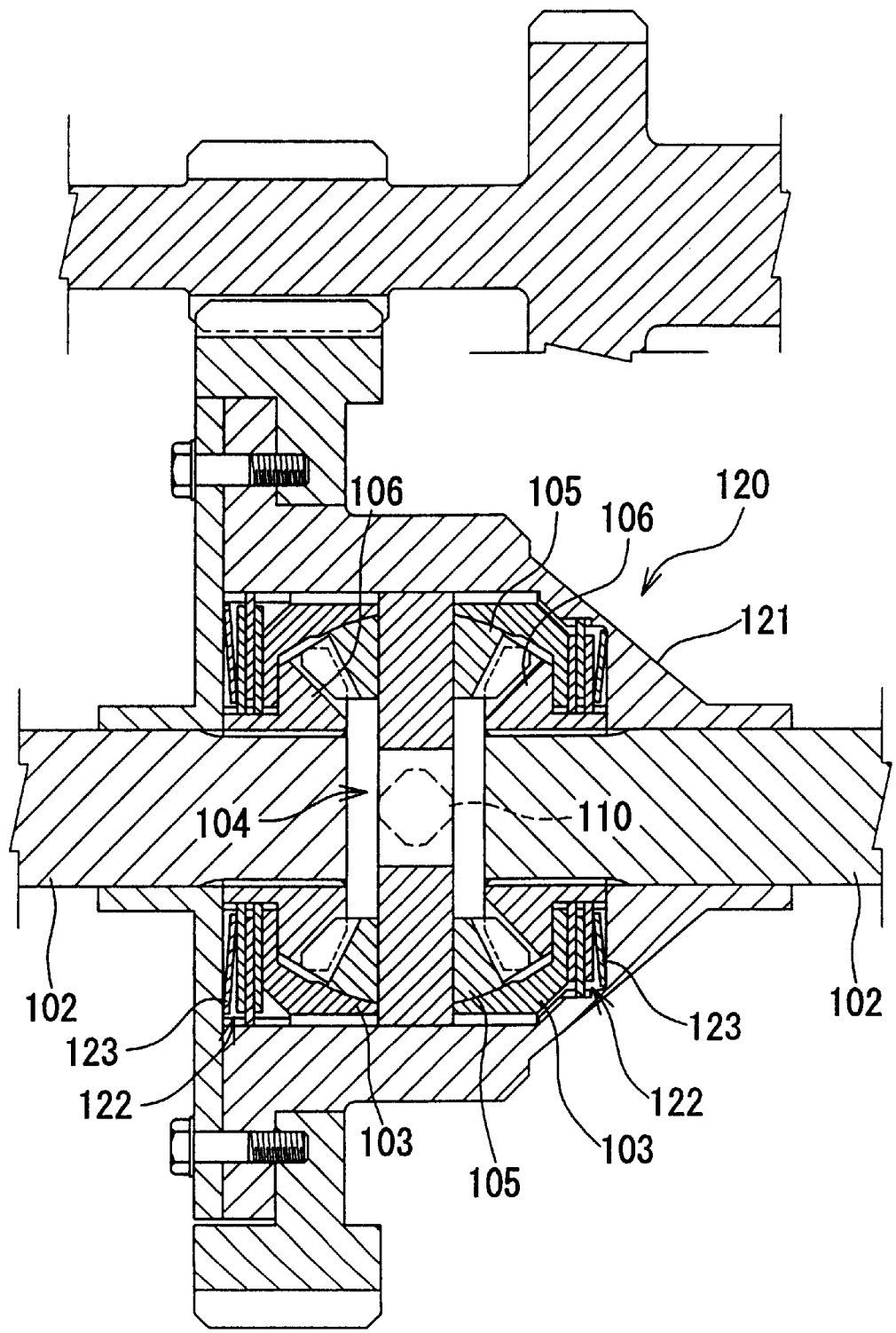
FIG. 12 is a transverse cross-section of a differential gear of another configuration according to prior art.

As shown in FIG. 10, this differential gear 10C comprises: a differential case 11C that is rotated by a driving force from the engine around the left and right axles 1; pressure ring 12 that is provided in the differential case 11C so they can move freely in the direction of axles but cannot rotate relatively to the differential case 11C; a pinion shaft 13 provided at right angles to the axles 1, the end of which are held between the pressure ring 12 and the ring opposing face 45 of the differential case 11C facing the pressure ring 12; at least one pair of pinion gears 14 provided rotatably around the pinion shaft 13; side gears 15 and 15C that are provided at the ends of the left and right axles 1 such that they cannot rotate relatively, that sandwich the pinion gears 14 and that engage with the pinion gears 14 on the opposite sides thereof; a clutch means 16 provided on the opposite side to the ring opposing face 45 of the pressure rings 12, and that can limit the differential between the left and right axles 1 by limiting the relative rotation between the differential case 11C and side gears 15 and 15C; an urging means 18C that urge the pressure rings in such direction as to increase the clearance 17C between the pressure ring 12 and the ring opposing face 45 of the differential case 11C is narrowed without use of the clutch means 16; and an operation means 19C that operates the pressure ring 12 against the urging force of the urging means 18C so as to increase the clearance 17 between the pressure ring 12 and the ring opposing face 45 of the differential case 11C in accordance with the increase in relative torque between the pinion shaft 13 and differential case 11C when there is a differential, and that works the clutch means 16.

The differential case 11C is formed so that the right part of the case 21C is narrowed. The right side pressure ring 12 in the above aspect of the embodiment, the clutch means 16 on the right side, and the disc spring 33 on the right side are all omitted. A gear chamber 26C is formed between the left pressure ring 12 and right part of the case 21C, and a pinion shaft 13, pinion gears 14, and side gears 15 are installed in this gear chamber 26C. Also, a side gear 15C, in which a groove 30 is not formed on the sleeve 29C, is used instead of the right side gear 15, and this side gear 15C is installed in the right of the case 21C so that it rotates freely.

A ring opposing face 45 is formed at right angles to the axles 1 in the part of the case 21C that faces the right end of the pressure ring 12. Cams 27C, from which the right half of the cam in the above aspects of the embodiment have been removed, are installed on the ends of the pinion shaft 13. By holding the cam 27C between cam groove 28 and the ring opposing face 45 of the case 21C, the pinion shaft 13 is supported between the pressure ring 12 and case 21C.

The operating means 19C comprises cam grooves 28 and cams 27C. This operating means 19C basically functions in the same way as the operating means 19 described above and is configured so that when a relative torque is produced between the pinion shaft 13 and the differential case 11C, the operating force acts on the pressure rings 12 so that they both move away from the ring opposing face 45 and the clearance 17C between the pressure rings 12 and ring opposing face 45 increases.

The urging means 18C comprises a rod member 35C and an elastic member 37C created from compression coil springs. A guard 36 is formed at the left end of the rod member 35C and a spiral part is formed at the right end. Then, with an elastic member 37 covering the rod member 35C, the rod member 35C is inserted into the holes formed in the pressure ring 12 and then joined to and fixed onto the case 21C. This urging means 18C constantly exerts a force on the pressure ring 12 to move it towards the ring opposing face 45, that is in a direction that means that the clearance 17C between the pressure ring and the ring opposing face will decrease. As with the above aspects of the embodiment, any number and any arrangement of urging means 18C can be used.

In this differential gear 10C, as with the above differential gear 10, the torque for the engine from the drive axle 2C is transmitted to the differential case 11C via the pinion gear 3C and the ring gears 23C. When the rotation resistance of the left and right wheels is the same, the pinion gear 14, side gears 15 and 15C, pinion shaft 13, and pressure ring 12 rotate as one with the differential case and the left and right wheels rotate at the same speed. Also, when the automobile is moving forwards and the rotation resistance of the wheels on one side is less than on the other side, basically, the pinion gear 14 engages into the side gears 15 and 15C and revolves using part of the torque acting on the differential case 11C. This results in a differential state in which the rotation speed of the wheels on the side of least rotation resistance is greater than that of the wheels on the side of greatest rotation resistance. When the automobile is moving at high speeds and under a heavy load, the operation means 19C forces the pressure ring 12 to move away from the ring opposing face 45. Friction abutting of clutches 31 and 32 in the clutch means 16 causes the relative rotation of the side gears 15 and 15C and the differential case to be limited, resulting in a limited differential state. While turning ability is improved at low speeds, maneuverability at high speeds and under heavy loads can also be maintained. There is no clutch means 16 provided for the right side gear 15C but, in a limited differential state, the differential between the side gears 15C and differential case 11C is limited by the clutch means 16 via the pinion gears 14 and the left side gear 15.

Also, in this differential gear 10C, the pressure ring 12 is forced towards the ring opposing face 45 by urging means 18C without going via the clutch means 16 and so, the timing of switching from a differential state to a limited differential state depends only on the operating force of the operating means 19C and the urging force of the urging means 18C. By setting the urging force of the urging means 18C to an appropriate level, an accurate differential state can be obtained for low speed turning and an accurate limited differential state can be obtained for turning at high speeds or under heavy loads.

The differential gear according to FIGS. 1–9 basically works in the same way as a conventional differential gear with a limited slip differential function. However, in this differential gear, a force is exerted on the pressure rings by the urging means in a direction that decreases the clearance without going through the clutch means, and therefore the timing of switching between differential and limited differential states depends only on the operating force of the operating means and the urging force of the urging means. Therefore, by setting the urging force in the urging means to an appropriate level, an accurate differential state is obtained for low speed turning and an accurate limited differential state is obtained for turning at high speeds and under heavy loads.

The same effects are produced in the differential gear according FIG. 10. In addition, only one clutch means need by incorporated into this differential gear and so this improves the ease with which the differential gear can be assembled and enables the clutch means to be incorporated where there is sufficient space. This in turn enables smaller differential gears to be built, enables maximization of clutch plate size, and increased frictional welding force. Accordingly, this differential gear is suitable for use in transverse engines for which there are severe restrictions on the shape and size of the differential case.

When urging means are placed close to the ends of each pinion shaft within the pressure rings, the ease with which the pressure rings can slide can be improved.

When urging means are placed close to the axle ends adjoining the pinion shaft within the pressure rings, the pressure rings and differential case can be made smaller. In addition, the contact area between the pinion shaft and pressure rings is increased and damaged and wear to these members is effectively prevented, thus improving the durability of the differential gear.

What is claimed is:

1. A differential gear, comprising:
    a differential case that is rotated by a driving force from an engine around left and right axles defining a rotation axis;
    a pair of pressure rings accommodated in said differential case so as to be able to move freely in the direction of the rotation axis but unable to rotate relatively to the differential case;
    at least one pinion shaft provided at right angles to the rotation axis with an end thereof held between said pressure rings;
    at least one pair of pinion gears provided rotatably on said pinion shaft;

a pair of side gears, each being placed at the end of said left and right axles so as to be unable to rotate relatively to the axles, that sandwich the pinion gears and engage with the pinion gears on the opposite sides thereof;

a set of clutch means arranged on the opposite sides, in the direction of the rotation axis, of said pressure rings to limit a differential movement between the left and right axles by limiting the relative rotation of the differential case and the side gears;

urging means that urges the pressure rings in such directions as to decrease the clearance between the pressure rings without use of said clutch means; and operation means that operates the pressure rings against the urging force exerted by the urging means in such directions as to increase the clearance between the pressure rings in accordance with an increase in the relative rotation torque between the pinion shaft and differential case in a differential state.

2. A differential gear, comprising:

a differential case that is rotated by a driving force from an engine around left and right axles defining a rotation axis;

a pressure ring accommodated in said differential case so as to be able to move freely in the direction of the rotation axis but unable to rotate relatively to the differential case;

a pinion shaft provided at right angles to the rotation axis with an end thereof being held between a first side of said pressure ring and a face of the differential case opposed to the pressure ring;

at least one pair of pinion gears provided rotatably on said pinion shaft;

a pair of side gears, each being placed at the end of said left and right axles so as to be unable to rotate relatively to the axles, that sandwich the pinion gears and engage with the pinion gears on the opposite sides thereof;

clutch means arranged on a second side of said pressure ring opposed to the first side of the pressure ring, to limit a differential movement between the left and right axles by limiting the relative rotation of the differential case and the side gears;

urging means that urges the pressure ring in such direction as to decrease the clearance between the pressure ring and the face of the differential case opposed to the pressure ring without use of the clutch means; and operation means that operates the pressure ring against the urging force exerted by the urging means in such direction as to increase the clearance between the pressure ring and the face of the differential case opposed to the pressure ring in accordance with an increase in the relative rotation torque between the pinion shaft and differential case in a differential state.

3. The differential gear according to claim 1, wherein said urging means is provided in a vicinity of a pinion shaft end of the pinion shaft within the pressure rings.

4. The differential gear according to claim 1, wherein said urging means is provided between ends of the pinion shaft within the pressure rings.

5. The differential gear according to claim 1, wherein said urging means includes at least one spring exerting a force in the direction of the rotation axis.

6. The differential gear according to claim 5, wherein said spring comprises a pair of coil springs having coil spring axes aligned parallel to the rotation axis.

7. The differential gear according to claim 2, wherein said urging means is provided in a vicinity of the pinion shaft end within the pressure ring.

8. The differential gear according to claim 2, wherein the pinion shaft comprises multiple ends and said urging means is provided between the multiple ends of the pinion shaft within the pressure ring.

* * * * *